US010365019B2

(12) United States Patent
Muller (10) Patent No.: US 10,365,019 B2
(45) Date of Patent: Jul. 30, 2019

(54) MAGNETOCALORIC THERMAL APPARATUS

(71) Applicant: COOLTECH APPLICATIONS, Holtzheim (FR)

(72) Inventor: Christian Muller, Strasbourg (FR)

(73) Assignee: COOLTECH APPLICATIONS, Holtzheim (FR)

( * ) Notice: Subject to any disclaimer, the term of this patent is extended or adjusted under 35 U.S.C. 154(b) by 68 days.

(21) Appl. No.: 15/527,165

(22) PCT Filed: Nov. 25, 2015

(86) PCT No.: PCT/EP2015/077621
§ 371 (c)(1),
(2) Date: May 16, 2017

(87) PCT Pub. No.: WO2016/083440
PCT Pub. Date: Jun. 2, 2016

(65) Prior Publication Data
US 2017/0336108 A1    Nov. 23, 2017

(30) Foreign Application Priority Data
Nov. 26, 2014 (FR) .................... 14 61488

(51) Int. Cl.
*F25B 21/00*    (2006.01)
(52) U.S. Cl.
CPC ...... *F25B 21/00* (2013.01); *F25B 2321/0022* (2013.01); *Y02B 30/66* (2013.01)
(58) Field of Classification Search
CPC .... F25B 21/00; F25B 21/02; F25B 2321/002; F25B 2321/0022; F25B 2321/0023; H01F 7/0278
See application file for complete search history.

(56) References Cited

U.S. PATENT DOCUMENTS

| 7,038,565 B1* | 5/2006 | Chell ............... F25B 21/00 310/154.06 |
| 2008/0223853 A1* | 9/2008 | Muller ............ F25B 21/00 219/672 |

(Continued)

FOREIGN PATENT DOCUMENTS

| FR | 2 987 433 A1 | 8/2013 |
| FR | 2 994 018 A1 | 1/2014 |

OTHER PUBLICATIONS

International Search Report Corresponding to PCT/EP2015/077621 dated Feb. 17, 2016.

(Continued)

*Primary Examiner* — Brian M King
(74) *Attorney, Agent, or Firm* — Davis & Bujold PLLC; Michael J. Bujold (57) ABSTRACT

A magnetocaloric thermal apparatus (1) with a structure that rotates about a longitudinal axis (L), comprising a magnetic arrangement that defines at least two air gaps (E1, E2) parallel to each other and configured to create, in each of the air gaps, a magnetic field variable about the longitudinal axis (L). Two supports (S1, S2) carry magnetocaloric elements (2) and are positioned each in the midplane (P1, P2) of one of the air gaps. The magnetic arrangement and the supports are in relative movement with respect to one another and positioned angularly with respect to one another about the longitudinal axis (L) so as to generate a phase shift between the magnetic cycle undergone by the magnetocaloric elements (2) of one of the supports (S1) in one of the air gaps and the magnetic cycle undergone by the magnetocaloric elements of the other support (S2) in the other air gap.

13 Claims, 4 Drawing Sheets

(56) References Cited

U.S. PATENT DOCUMENTS

2010/0300118 A1   12/2010  Heitzler et al.
2011/0061399 A1*  3/2011  Chang ................... F25B 21/00
                                                                  62/3.1
2011/0067415 A1*  3/2011  Mao ...................... F25B 21/00
                                                                  62/3.1

OTHER PUBLICATIONS

Written Opinion Corresponding to PCT/EP2015/077621 dated Feb. 17, 2016.

* cited by examiner

MAGNETOCALORIC THERMAL APPARATUS

TECHNICAL SCOPE

The present invention relates to a magnetocaloric thermal apparatus with a structure that rotates about a longitudinal axis, said thermal apparatus comprising a magnetic arrangement that defines at least two air gaps at least partly superimposed and parallel to each other, and configured to create in each of said air gaps a magnetic field variable about the longitudinal axis, at least two at least partly superimposed supports located each in the midplane of one of said air gaps and carrying magnetocaloric elements at least partly superimposed between said supports, said magnetic arrangement and said supports being in relative movement with respect to one another about the longitudinal axis to subject the magnetocaloric elements of each support to a magnetic cycle created by the variable magnetic field in the corresponding air gap.

PRIOR ART

The present invention relates to the field of magnetic refrigeration, and more specifically that of thermal apparatuses using the magnetocaloric effect of so-called magnetocaloric materials.

The magnetocaloric effect (MCE) of the magnetocaloric materials consists in a variation of their temperature when they are subjected to a magnetic field with a variable intensity. It is thus sufficient to subject these materials to a succession of cycles comprising alternating magnetization and demagnetization phases and to perform a thermal exchange with a heat transfer fluid that passes across said materials to achieve the widest temperature variation possible between the ends of said materials. This cycle is repeated up to frequencies of several Hertz. The efficiency of such a magnetic refrigeration cycle surpasses that of a classical refrigeration cycle by about 50%.

The magnetocaloric material warms up almost instantly when it is placed in a magnetic field and it cools down according to a same thermal dynamics when it is removed from the magnetic field. During these magnetic phases, the heat transfer fluid either heats up on contact with the magnetocaloric material during a so-called magnetization phase, or cools down on contact with the magnetocaloric material during a so-called demagnetization phase. In a general way, in the applications operating at ambient temperature, the heat transfer fluid is a liquid and circulates in rectilinear channels or through pores that exist in the magnetocaloric material. To that purpose, the heat transfer fluid can be pure water or water with antifreeze, for example a glycolated product or a brine.

The higher the magnetic field in the air gap, the stronger the magnetocaloric effect induced in the magnetocaloric material, which leads to an increase of the thermal output as well as of its temperature gradient between its two heat transfer fluid inlet/outlet ends and therefore of the global efficiency of such a magnetocaloric thermal apparatus. Likewise, when the frequency of the cycles increases, the thermal output (for example: the refrigeration) provided by the thermal apparatus also increases. To have this output increase in proportion to the frequency increase, it is necessary to have a magnetic arrangement able to generate a uniform and intense magnetic field in at least one air gap and to perform the relative movement of this magnetic arrangement with respect to the magnetocaloric elements by consuming the least amount of energy possible.

To that purpose, the rotary structures are preferred, as they allow, on the one hand, to build a compact thermal apparatus with the magnetic arrangement in movement with respect to the magnetocaloric material(s) and, on the other hand, to provide a good ratio of magnetocaloric material per used volume. Since the thermal output of the thermal appliance depends in particular on the quantity of magnetocaloric material used, such arrangement is actually very advantageous. The applicant filed to that purpose the patent applications FR 2 987 433 and FR 2 994 018 relating to rotary magnetic arrangements. Publication FR 2 994 018 corresponds to the preamble of claim 1.

However, given that the magnetic permeability of air is lower than that of the magnetocaloric materials, the relative movement of the magnetocaloric materials with respect to the magnetic arrangement or conversely leads in the air gap to an alternation of different magnetic permeabilities, with a higher magnetic attraction when the magnetocaloric material passes. Therefore, the movement or the angular speed of the magnetic arrangement or of the magnetocaloric elements is neither naturally continuous nor uniform and generates jolts. This situation is troublesome as it disturbs the magnetic cycle, reducing the thermal output and increasing the energy consumption. It also leads to an increase of the operating sound level of the apparatus and has a negative influence on its endurance and mechanical stability.

DESCRIPTION OF THE INVENTION

The present invention aims to overcome these disadvantages by offering a magnetocaloric thermal apparatus comprising a specific layout of the magnetic arrangement and/or of the magnetocaloric elements allowing to reduce the magnetic moment and therefore also the mechanical moment required for driving the magnetic arrangement in order to achieve a rotary and continuous relative movement of the magnetic arrangement with respect to the magnetocaloric materials.

To that purpose, the invention relates to a thermal apparatus as described in the preamble, characterized in that the magnetic arrangement and the supports are positioned angularly with respect to one another about the longitudinal axis so as to generate a phase shift between the magnetic cycle undergone by the magnetocaloric elements of one of the supports in one of the air gaps and the magnetic cycle undergone by the magnetocaloric elements of the other support in the other air gap, so that the magnetocaloric elements enter the magnetic field of said air gaps progressively and continuously between the supports, the magnetic attraction effort obtained being then almost constant. This phase shift is achieved by construction that is to say by the layout or the specific positioning of the magnetic arrangement and/or of the magnetocaloric elements with respect to each other.

In a first embodiment, the magnetic arrangement can comprise a first, a second and a third magnetizing structure provided each with at least one pair of magnetic poles, and positioned successively along the longitudinal axis of the thermal apparatus so as to define, with their pairs of magnetic poles, said air gaps, and said magnetizing structures can be positioned angularly with respect to each other about the longitudinal axis in order to generate in one of the air gaps a magnetic cycle that is shifted by a phase-shift angle with respect to the magnetic cycle in the other air gap.

In this embodiment, the first and third magnetizing structures can be identical, mounted with an angular offset between them that corresponds to the phase-shift angle.

Moreover, the second magnetizing structure can comprise on the one hand first magnetic poles that form a first air gap with the corresponding magnetic poles of the first magnetizing structure and, on the other hand, second magnetic poles that form a second air gap with the corresponding magnetic poles of the third magnetizing structure, and the first and second magnetic poles of said second magnetizing structure can be mounted with an angular offset that corresponds to the phase-shift angle.

In a first variant of this first embodiment, the first and the third magnetizing structures can be mounted head to tail and angularly offset by an angle that corresponds to the phase-shift angle, the first magnetic poles of the second magnetizing structure can have the same magnetization direction as the magnetic poles of the first magnetizing structure they cooperate with to form the air gap, the second magnetic poles of the second magnetizing structure can have the same magnetization direction as the magnetic poles of the third magnetizing structure they cooperate with to form the air gap, and the magnetization direction of the first and second magnetic poles can be the same to create one single circulation loop of the magnetic flux inside of said apparatus passing through said first, second and third magnetizing structures.

In a second variant of this first embodiment, the first and the third magnetizing structures can be mounted opposite to each other and angularly offset by an angle that corresponds to the phase-shift angle, the first magnetic poles of the second magnetizing structure can have the same magnetization direction as the magnetic poles of the first magnetizing structure they cooperate with to form the air gap and create a first circulation loop of the magnetic flux inside of said apparatus passing through said first magnetic poles of the second magnetizing structure and said magnetic poles of the first magnetizing structure. The second magnetic poles of the second magnetizing structure can have the same magnetization direction as the magnetic poles of the third magnetizing structure they cooperate with to form the air gap and create a second circulation loop of the magnetic flux inside of said apparatus passing through said second magnetic poles of the second magnetizing structure and said magnetic poles of the third magnetizing structure. The magnetization direction of the second magnetic poles can be opposite to that of the first magnetic poles to have the magnetic flux circulate in the first loop in the direction opposite to the magnetic flux that circulates in the second loop.

Moreover, the magnetocaloric elements can be positioned angularly on their supports with respect to each other according to a predefined angle and the phase-shift angle can be smaller than the angle between two adjacent magnetocaloric elements.

In addition, the supports can be geometrically identical and arranged parallel to each other in the corresponding air gaps without angular offset. The supports are preferably plane.

In the second embodiment of the invention, the supports can also be geometrically identical, arranged parallel to each other in the corresponding air gaps, but offset angularly with respect to each other by an angle that corresponds to the phase-shift angle.

In this embodiment, the magnetocaloric elements can be positioned angularly on their supports with respect to each other according to a predefined angle and the angular offset between the two supports can be smaller than the angle between two adjacent magnetocaloric elements.

For example, the offset angle between the two supports can be equal to half the angle between two adjacent magnetocaloric elements.

In this second embodiment, the magnetic arrangement can comprise a first, a second and a third magnetizing structure positioned successively along the longitudinal axis and defining, with their aligned magnetic poles mounted according to two opposite magnetization directions, the first and the second air gap.

In both embodiments, the magnetocaloric elements can comprise N rectangle parallelepipeds provided with magnetocaloric material and arranged in a crown-shaped area of said support, said crown being centered on the longitudinal axis. This crown can be defined by two concentric circles called internal circle and external circle. In this case, two of the opposite sides of the rectangle parallelepipeds that form said magnetocaloric elements called end sides can be tangent each to one of said concentric circles, and the longitudinal median axes of two adjacent magnetocaloric elements can form between them an angle equal to 360/N degrees.

In both embodiments the magnetic poles can have the shape of ring portions that extend over angular sectors whose angle is determined so that the entry of the magnetocaloric elements in the magnetic field of said magnetic poles starts with an edge that belongs to one of said end sides. One thus creates the most progressive and continuous magnetic induction variation possible in each magnetocaloric element, which allows further reducing the force required to make the magnetocaloric elements enter and exit the magnetic field of the air gap.

In both embodiments, the magnetocaloric elements can be positioned radially on said support.

In both embodiments, to simplify the structure of the thermal apparatus, the magnetic poles of each magnetizing structure can be identical, but mounted according to two opposite magnetization directions.

For the purpose of this invention, a magnetocaloric element must be understood as a physical element comprising magnetocaloric material. A magnetocaloric element can in particular comprise several types of magnetocaloric materials and react to different temperatures, which generates a thermal gradient along the magnetocaloric element. So, the magnetocaloric materials making up the magnetocaloric elements can have different Curie temperatures, arranged in increasing or decreasing order.

The magnetocaloric elements liable to be positioned in the air gap of the thermal apparatus according to the invention are intended to be in thermal contact with a heat transfer fluid. This heat transfer fluid can for example circulate from their cold end towards their hot end during a first magnetization phase of the magnetic cycle, which corresponds to a phase during which the magnetocaloric elements are positioned in an air gap and are subjected to a magnetic field (leading to an increase of their temperature), and from their hot end towards their cold end during a subsequent demagnetization phase of the magnetic cycle, during which the magnetocaloric elements are positioned outside the air gap and are subjected to a zero magnetic field (leading to a decrease of their temperature). So, a magnetocaloric cycle comprises a magnetization phase and a demagnetization phase.

The thermal contact between the heat transfer fluid and the magnetocaloric elements can be achieved with a heat transfer fluid passing along or through the magnetocaloric elements. The magnetocaloric elements can include circulation paths for the fluid extending between the two ends of the magnetocaloric elements. These paths can be obtained thanks to the porosity of the magnetocaloric materials, or by channels obtained for example by means of a set of possibly grooved or pre-formed plates of magnetocaloric material, assembled and uniformly spaced, or made in machined blocks of magnetocaloric material. The magnetocaloric elements can also have the form of spheres of calibrated size, so that the gaps form fluid passages. Any other embodiment allowing the heat transfer fluid to perform heat exchange with the material forming a magnetocaloric element may of course be suitable.

The above described permanent magnets used to realize the magnetic field generator according to this invention have preferably a uniform induction.

BRIEF DESCRIPTION OF THE DRAWINGS

The present invention and its advantages will be better revealed in the following description of embodiments given as non limiting examples, in reference to the drawings in appendix, in which.

ILLUSTRATIONS OF THE INVENTION AND VARIOUS WAYS OF REALIZING IT

In the illustrated embodiment examples, the identical pieces or parts have the same numerical references.

The attached FIGS. 1 to 6 represent schematically a magnetocaloric thermal apparatus 1, 10, 100, 110 with a structure that rotates about a longitudinal axis L and according the two embodiments of the invention. This thermal apparatus 1, 10, 100, 110 comprises mainly a magnetic arrangement that comprises three magnetizing structures $SM_1$, $SM_2$, $SM_3$ at least partly superimposed and parallel to each other about said longitudinal axis L, which will be described below, two preferably identical supports $S_1$, $S_2$ at east partly superimposed and parallel to each other, located in air gaps $E_1$, $E_2$ defined by the magnetizing structures and carrying magnetocaloric elements 2, a (not represented) device for circulating a heat transfer fluid through magnetocaloric elements 2, and (not represented) heat exchangers to perform the heat exchange with the environment or an external application.

Figures 4A, 4B:
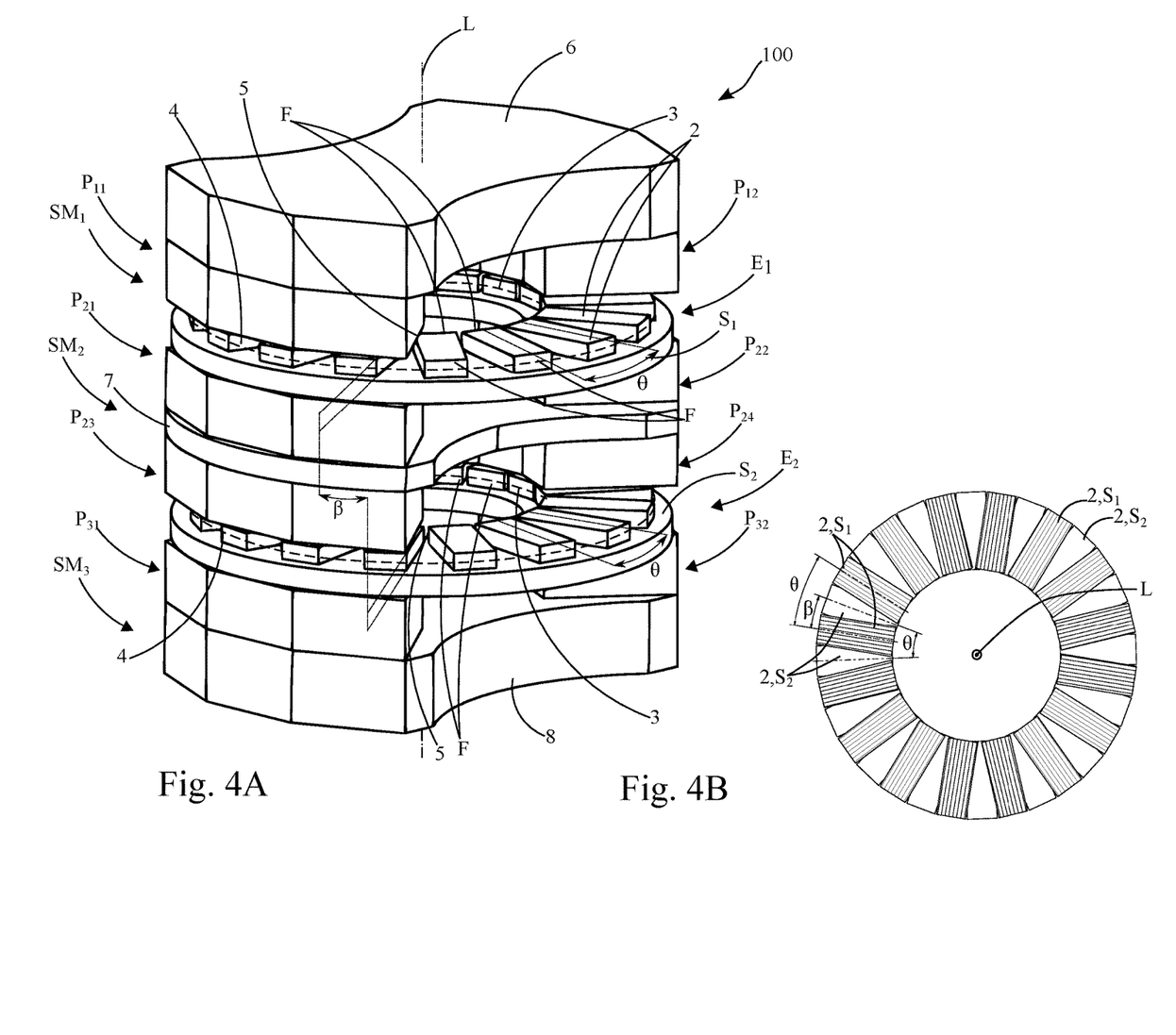
FIG. 4A is a simplified schematic representation of a magnetocaloric thermal apparatus according to a second embodiment.
FIG. 4B is a representation of the two superimposed magnetocaloric element supports, illustration their angular offset about the central longitudinal axis.
Figure 5:
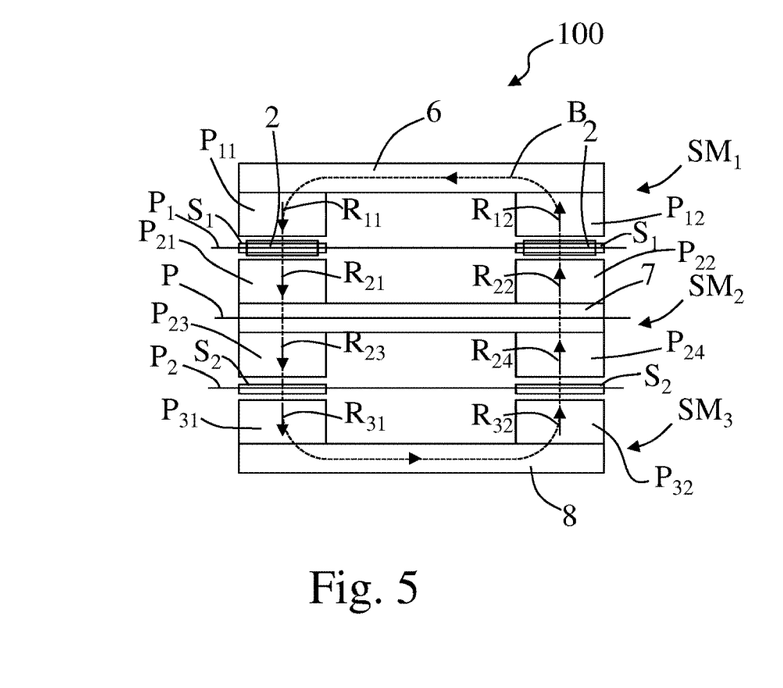
FIG. 5 is a schematic view of the apparatus of FIG. 4A showing more specifically its magnetic arrangement.

First magnetizing structure $SM_1$ and third magnetizing structure $SM_3$ of thermal apparatus 1, 10, 100, 110 are preferably identical. This allows having only one part liable to form first $SM_1$ and third $SM_3$ magnetizing structures. In the embodiments represented in FIGS. 1 and 2, and 4A, 4B and 5, these first and third magnetizing structures $SM_1$, $SM_3$ are mounted head to tail and arranged opposite to each other parallel to a transversal central plane P, with an angular offset α between them for the first embodiment (FIGS. 1 and 2) and without angular offset for the second embodiment (FIGS. 4A, 4B and 5). In the variants represented in FIGS. 3 and 6, the first and third magnetizing structures $SM_1$, $SM_3$ are simply mounted opposite to each other parallel to transversal central plane P, with an angular offset α between them for the variant of FIG. 3 and without angular offset for the variant of FIG. 6.

In both embodiments, second magnetizing structure $SM_2$ is located between first magnetizing structure $SM_1$ and third magnetizing structure $SM_3$ in order to delimit at least two and in the represented example four air gaps $E_1$, $E_2$ at least partly superimposed two by two and diametrally opposed two by two about transversal planes $P_1$ and $P_2$ parallel to central plane P, a support $S_1$, $S_2$ carrying magnetocaloric elements 2 being mounted in each of them. Moreover, air gaps $E_1$ and $E_2$ can have the same volume.

In both illustrated embodiments, the magnetocaloric elements 2 of each support S1, S2 are split up in four groups, of which two diametrally opposed groups located each in one of air gaps $E_1$, $E_2$ and subjected to a magnetization phase during which they generate calories, alternating with two other groups located each outside of said air gaps $E_1$, $E_2$ and subjected to a demagnetization phase during which they generate frigories. This arrangement depends of course on the number of magnetic poles defined by magnetizing structures $SM_1$, $SM_2$, $SM_3$.

In all cases, the magnetocaloric elements 2 of supports S1, S2 are at least partly superimposed or substantially aligned with each other, and they are in a same magnetic state, with the difference of the offset angle. They thus can be connected to each other in a same thermal loop, allowing to simplify and optimize the design of the (not represented) heat transfer fluid circulating devices. The superposition about longitudinal axis L of magnetizing structures $SM_1$, $SM_2$, $SM_3$ and of supports S1, S2 allows increasing the number of magnetocaloric elements 2 which are in a same magnetic state for the purpose of increasing the temperature gradient if they are connected serially or the thermal output if they are connected in parallel, without having to multiply the number of (not represented) devices for circulating the heat transfer fluid through said magnetocaloric elements 2. According to a first embodiment referring to FIGS. 1 to 3, the first and the third magnetizing structures $SM_1$, $SM_3$ are mounted with respect to each other with an angular offset of angle α. One thus obtains in at least partly superimposed air gaps E1 and E2 magnetic induction profiles which are identical, but angularly phase-shifted with respect to each other by angle α. This allows achieving a compensation of the magnetic effort induced by the penetration of supports $S_1$ and $S_2$ in their respective air gaps $E_1$, $E_2$. This angular offset α allows smoothing the magnetic penetration effort when entering the magnetic field of magnetocaloric elements 2. Due to this angular offset, magnetocaloric elements 2 penetrate progressively in the magnetic field of said air gaps $E_1$, $E_2$, in a continuous way between supports $S_1$ and $S_2$. There is therefore a continuous flow of magnetocaloric material entering or exiting the magnetic field and the magnetic attraction effort is then almost constant and causes almost no jerk in the movement of the magnetic structures.

In both embodiments, each magnetizing structure $SM_1$, $SM_2$, $SM_3$ comprises a base 6, 7, 8 out of a ferromagnetic material, on which permanent magnets and/or ferromagnetic parts forming at least one pair of diametrically opposed magnetic poles $P_{11}$, $P_{12}$; $P_{21}$, $P_{22}$; $P_{23}$, $P_{24}$; $P_{31}$, $P_{32}$ are mounted. In the illustrated examples, the magnetic poles comprise each three magnets mounted on base 6, 7, 8. The base of first and third magnetizing structures $SM_1$, $SM_3$ is made out of a material able to conduct the magnetic field that is to circulate between the two magnetic poles $P_{11}$, $P_{12}$; $P_{31}$, $P_{32}$ of each first and third magnetizing structure $SM_1$, $SM_3$.

For that purpose, magnetic pole $P_{11}$ of first magnetizing structure $SM_1$ has a magnetic induction resultant $R_{11}$ that is on the one hand parallel to longitudinal axis L and to magnetic induction resultant $R_{12}$ of the other magnetic pole $P_{12}$ of this first magnetizing structure $SM_1$ and, on the other hand, has a direction opposite to magnetic induction resultant $R_{12}$ of said magnetic pole $P_{12}$ This applies to the other magnetizing structures $SM_2$ and $SM_3$. So, for every pair of magnetic poles $P_{21}$, $P_{22}$; $P_{23}$, $P_{24}$; $P_{31}$, $P_{32}$ of a same magnetizing structure and located in a same pair of air gaps $E_1$, $E_2$, the induction resultants $R_{21}$, $R_{22}$; $R_{23}$, $R_{24}$; $R_{31}$, $R_{32}$ are parallel to each other and to longitudinal axis L, with an opposite direction.

Figure 2:
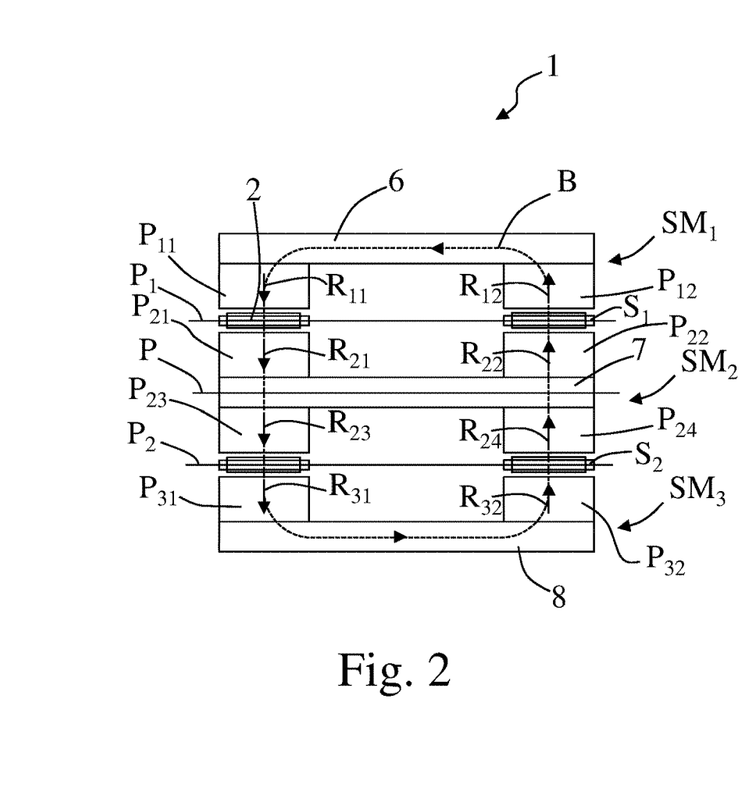
FIG. 2 is a schematic view of the apparatus of FIG. 1 showing more specifically its magnetic arrangement.

Therefore, referring to the first embodiment, by orienting the magnetization directions or magnetic induction resultants $R_{11}$, $R_{21}$, $R_{23}$, $R_{31}$ of magnetic poles $P_{11}$, $P_{21}$, $P_{23}$, $P_{31}$ located on a same side of thermal apparatus 1 in one direction and those $R_{12}$, $R_{22}$, $R_{24}$, $R_{32}$ of opposed magnetic poles $P_{12}$, $P_{22}$, $P_{24}$, $P_{32}$ located on the other side of thermal apparatus 1 in the opposite direction, as shown more specifically in FIG. 2, the magnetic induction flux induced by the magnetic arrangement forms one single closed loop B in apparatus 1. Referring to FIG. 2, the magnetic flux circulates in thermal apparatus 1:

from magnetic pole $P_{11}$ of first magnetizing structure $SM_1$ to first magnetic pole $P_{21}$ of second magnetizing structure $SM_2$, passing through one of air gaps $E_1$ and support $S_1$, then through base 7 out of ferromagnetic material of second magnetizing structure $SM_2$, from first magnetic pole $P_{21}$ to second magnetic pole $P_{23}$, then from second magnetic pole $P_{23}$ to magnetic pole $P_{31}$ of third magnetizing structure $SM_3$, passing through one of air gaps $E_2$ and support $S_2$, then through base 8 out of ferromagnetic material of third magnetizing structure $SM_3$, from magnetic pole $P_{31}$ to magnetic pole $P_{32}$, then from magnetic pole $P_{32}$ of third magnetizing structure $SM_3$ to second magnetic pole $P_{24}$ of second magnetizing structure $SM_2$, passing through the other air gap $E_2$ and support $S_2$, then from second magnetic pole $P_{24}$ of second magnetizing structure $SM_2$ to first magnetic pole $P_{22}$ of second magnetizing structure $SM_2$, through base 7 out of ferromagnetic material, then from first magnetic pole $P_{22}$ of second magnetizing structure $SM_2$ to magnetic pole $P_{12}$ of first magnetizing structure $SM_1$, passing through the other air gap $E_1$ and support $S_1$, then through base 6 out of ferromagnetic material of first magnetizing structure $SM_1$, from magnetic pole $P_{12}$ to magnetic pole $P_{11}$.

Figure 3:
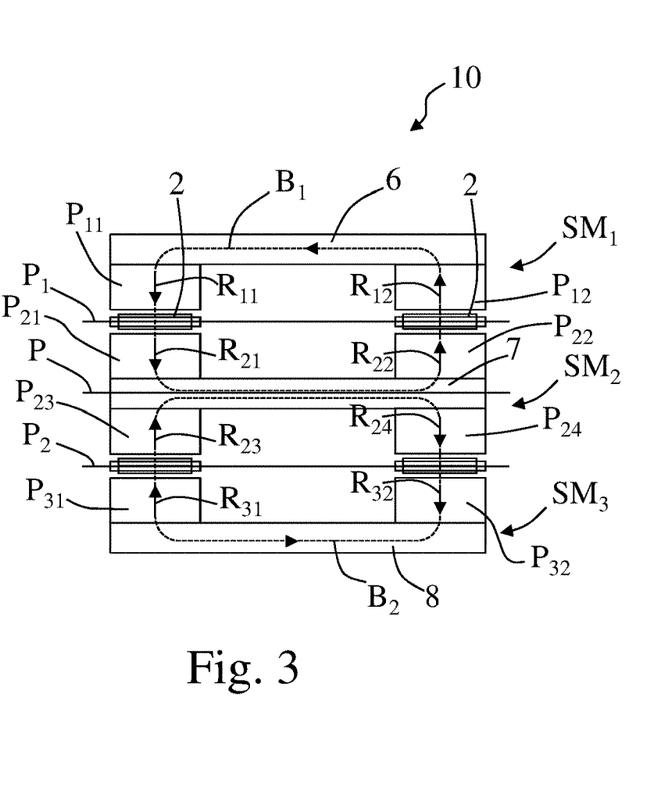
FIG. 3 is a view similar to that of FIG. 2 of an apparatus according to a variant of the first embodiment of the invention.

Referring to the variant of this embodiment illustrated in FIG. 3, in which thermal generator 10 only differs by a different orientation of the magnetization directions or magnetic induction resultants of certain magnetic poles, one obtains two magnetic loops $B_1$ and $B_2$. In this variant, the magnetic induction resultants $R_{23}$ and $R_{24}$ of second magnetic poles $P_{23}$ and $P_{24}$ of second magnetizing structure $SM_2$ are oriented in the direction opposite to the magnetic induction resultants $R_{21}$ and $R_{22}$ of first magnetic poles $P_{21}$ and $P_{22}$ of second magnetizing structure $SM_2$ The magnetic induction resultants $R_{11}$ and $R_{12}$ of magnetic poles $P_{11}$ and $P_{12}$ of first magnetizing structure $SM_1$ are oriented in the same direction as the magnetic induction resultants $R_{21}$ end $R_{22}$ of first magnetic poles $P_{21}$ and $P_{22}$ of second magnetizing structure $SM_2$, with which they cooperate to form first air gaps pair $E_1$. One thus obtains first magnetic loop $B_1$. Likewise, the magnetic induction resultants $R_{31}$ and $R_{32}$ of magnetic poles $P_{31}$ and $P_{32}$ of third magnetizing structure $SM_3$ are oriented in the same direction as the magnetic induction resultants $R_{23}$ end $R_{24}$ of second magnetic poles $P_{23}$ and $P_{24}$ of second magnetizing structure $SM_2$, which which they cooperate to form second air gaps pair $E_2$. One thus obtains second magnetic loop $B_2$. Referring to FIG. 3, the magnetic flux circulates in thermal apparatus 10 in first loop $B_1$:

from magnetic pole $P_{11}$ of first magnetizing structure $SM_1$ to first magnetic pole $P_{21}$ of second magnetizing structure $SM_2$, passing through one of air gaps $E_1$ and support $S_1$, then through base 7 out of ferromagnetic material of second magnetizing structure $SM_2$, from first magnetic pole $P_{21}$ to first magnetic pole $P_{22}$, then from first magnetic pole $P_{22}$ to magnetic pole $P_{12}$ of first magnetizing structure $SM_1$, passing through the other air gap $E_1$ and support $S_1$, then through base 6 out of ferromagnetic material of first magnetizing structure $SM_1$, from magnetic pole $P_{12}$ to magnetic pole $P_{11}$.

Likewise, referring to FIG. 3, the magnetic flux circulates in thermal apparatus 10 simultaneously in second loop $B_2$:

from magnetic pole $P_{31}$ of third magnetizing structure $SM_3$ to second magnetic pole $P_{23}$ of second magnetizing structure $SM_2$, passing through one of air gaps $E_2$ and support $S_2$, then through base 7 out of ferromagnetic material of second magnetizing structure $SM_2$, from second magnetic pole $P_{23}$ to second magnetic pole $P_{24}$, then from second magnetic pole $P_{24}$ to magnetic pole $P_{32}$ of third magnetizing structure $SM_3$, passing through the other air gap $E_2$ and support $S_z$, then through base 8 out of ferromagnetic material of third magnetizing structure $SM_3$, from magnetic pole $P_{32}$ to magnetic pole $P_{31}$.

In both embodiments, supports $S_1$, $S_2$ and magnetizing structures $SM_1$, $SM_2$, $SM_3$ are mounted about longitudinal axis L of thermal apparatus 1 with a relative rotary movement of the ones with respect to the others, so that magnetocaloric elements 2 can alternately enter and exit air gaps $E_1$, $E_2$.

Preferably, in order to simplify the mechanical construction and the fluid flows, supports $S_1$ and $S_2$ are fixed and magnetizing structures $SM_1$, $SM_2$, $SM_3$ are brought into rotation about longitudinal axis L by any suitable driving means. To that purpose, the relative position of the magnetizing structures $SM_1$, $SM_2$, $SM_3$ with respect to each other is maintained fixed, either rigidly or by magnetic attraction between them, for example. In this latter case, at least one of the magnetizing structures $SM_1$ is mounted rigidly on longitudinal axis L, which drives it into a rotational movement and the other magnetizing structures $SM_2$, $SM_3$ are mounted free to rotate on longitudinal axis L and driven in rotation by the magnetic attraction of moving magnetizing structure $SM_1$.

Even though magnetocaloric elements 2 represented in the attached drawings have the shape of rectangle parallelepipeds, this configuration is not limiting, and other shapes can be envisaged. So, for example, the magnetocaloric elements can have the shape of blocks, porous or comprising circulation channels, whose base is trapezoidal or comprises lateral sides which are not parallel to each other.

The supports $S_1$, $S_2$ comprising magnetocaloric elements 2 are preferably geometrically identical.

The present invention differs from those disclosed in the aforementioned applications by the specific positioning of magnetizing structures $SM_1$, $SM_2$, $SM_3$ with respect to each other and/or by the positioning of supports $S_1$ and $S_2$ with respect to each other. In fact, an angular offset is realized, which allows obtaining a preferably identical magnetic induction, but which is offset or phase-shifted between the at least partly superimposed air gaps $E_1$, $E_2$. This way, a magnetic compensation takes place between the magnetic efforts necessary to achieve a continuous movement of magnetizing structures $SM_1$, $SM_2$, $SM_3$ with respect to supports $S_1$, $S_2$ of said magnetocaloric elements 2, or vice-versa.

Figure 1:
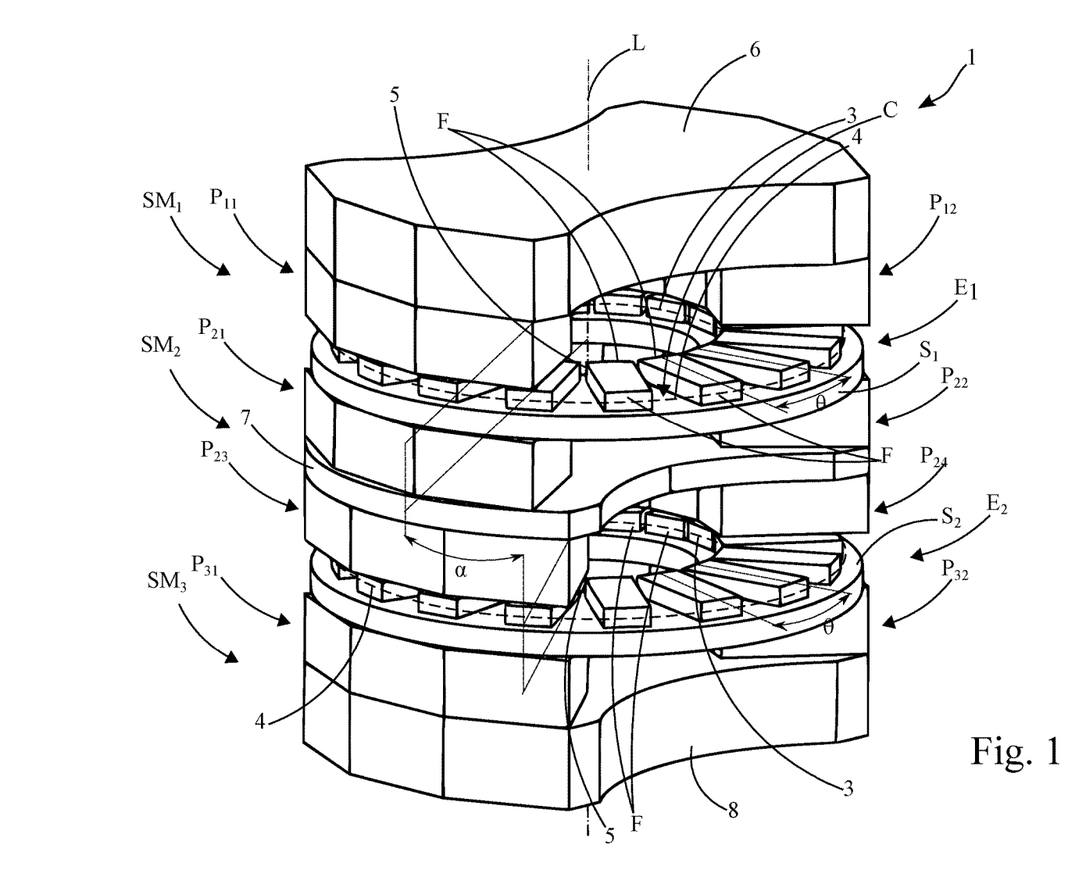
FIG. 1 is a simplified schematic representation of a magnetocaloric thermal apparatus according to a first embodiment of the invention.

So, referring to FIGS. 1 to 3, which represent a magnetocaloric thermal apparatus 1, 10 according to a first embodiment of the invention, the first and the third magnetizing structures $SM_1$, $SM_3$ are angularly offset with respect to each other by an angle $\alpha$. FIGS. 4A, 4B, 5 and 6 represent a thermal apparatus 100, 110 realized according to a second mode, in which it is the supports $S_1$ and $S_2$ that are angularly offset with respect to each other by an angle (3.

This offset angle $\alpha$ of magnetizing structures $SM_1$ and $SM_3$ in FIGS. 1 to 3 corresponds in this example to half angle $\theta$ between two consecutive magnetocaloric elements 2, the latter being arranged radially about longitudinal axis L. Magnetocaloric elements 2 can also be oriented or arranged in a non-radial way on their support $S_1$, $S_2$. Such configuration is not represented.

Magnetocaloric elements 2 are preferably arranged in an annular area of supports $S_1$ and $S_2$ that has the shape of a crown C. This crown C is delimited by an internal circle 3 and an external circle 4 that is concentric to internal circle 3. In the represented examples, the two most distant opposed sides of said magnetocaloric elements 2 are each tangent to one of concentric circles 3 and 4 and the longitudinal median axes of two adjacent magnetocaloric elements 2 form an angle $\theta$ equal to 360/N degrees to one another, N being the number of magnetocaloric elements 2 carried by a support $S_1$, $S_2$. Moreover, offset angle $\alpha$ of magnetizing structures $SM_1$ and $SM_3$ is preferably smaller than angle $\theta$ between two adjacent magnetocaloric elements 2.

Moreover, to further even more the continuous rotation of the various moving elements in thermal apparatus 1, 10 according to the invention, the various magnetocaloric elements 2 can be oriented with respect to the lateral sides of the magnetic poles so that the entry of magnetocaloric elements 2 in the magnetic fields of air gaps $E_1$, $E_2$ takes place progressively, starting with a corner or an angular end of magnetocaloric elements 2, and in particular with an edge 5 belonging to one of end sides F most distant from magnetocaloric elements 2, that is to say the side tangent to internal circle 3. This allows achieving a progressive entry of magnetocaloric elements 2 in the magnetic field, and thus furthering a continuous movement of magnetizing structures $SM_1$, $SM_2$, $SM_3$ with respect to supports $S_1$ and $S_2$ of magnetocaloric elements 2. Such configuration can also be transposed in the second embodiment, in which supports $S_1$ and $S_2$ are angularly offset.

In this first embodiment, illustrated in FIGS. 1, 2 and 3, magnetic poles $P_{21}$, $P_{22}$ of second magnetizing structure $SM_2$, which cooperate with first magnetizing structure $SM_1$, are angularly offset by an angle $\alpha$, which corresponds to offset angle $\alpha$, with respect to magnetic poles $P_{23}$, $P_{24}$ of second magnetizing structure $SM_2$, which cooperate with third magnetizing structure $SM_3$. From this results that the magnetic inductions in air gaps $E_1$, $E_2$ are also offset by a phase-shift angle equal to angle $\alpha$.

In such configuration, the field penetration effort is limited because the attraction effort of support $S_2$ in the magnetic field of air gaps $E_2$ does not take place simultaneously with the attraction effort of support $S_1$ in the magnetic field of air gaps $E_1$. Due to the successive penetrations of magnetocaloric elements elements 2 of support $S_1$ in the magnetic field of air gaps $E_1$ and of magnetocaloric elements elements 2 of support $S_2$ in the magnetic field of air gaps $E_2$, the magnetic effort then becomes continuous and almost constant.

In this configuration, the magnetic poles of the three magnetizing structures $SM_1$, $SM_2$, $SM_3$ extend on an identical angular sector, but which is angularly offset for some of said magnetic poles.

Figure 6:
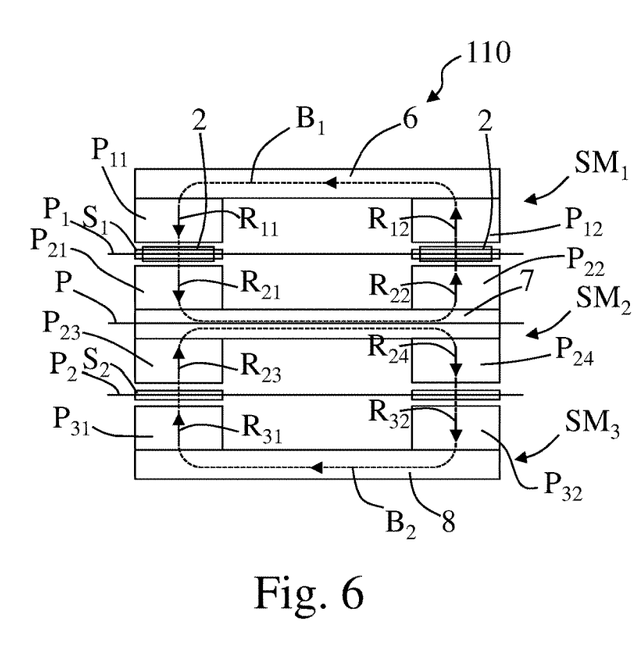
FIG. 6 is a view similar to that of FIG. 5 of an apparatus according to a variant of the second embodiment of the invention.

FIGS. 4A, 4B, 5 and 6 represent the second embodiment, in which thermal apparatus 100, 110 comprises two pairs of parallel air gaps $E_1$, $E_2$, in which supports $S_1$ and $S_2$ are arranged with an angular offset $\beta$ between them. More precisely, the magnetocaloric elements 2 of the two supports $S_1$ and $S_2$, which are strictly aligned longitudinally with each other and perfectly superimposed in the previous embodiment, are, in this variant, slightly offset longitudinally by said angle $\theta$ and partly superimposed to generate a continuity of magnetocaloric material between the two supports $S_1$ and $S_2$. To that purpose, FIG. 4B represents only the positioning of the two supports $S_1$ and $S_2$ with respect to each other, superimposed and offset by an angle $\beta$. To facilitate understanding, magnetocaloric elements 2 of support $S_1$ are represented hatched, this hatching can in particular illustrate the circulation channels of the heat transfer fluid through said magnetocaloric elements 2, while magnetocaloric elements 2 of support $S_2$ are not hatched. This configuration represents a particular case, in which offset angle $\theta$ is equal to half angle $\theta$ between the two longitudinal median axes of two adjacent magnetocaloric elements 2 of a support $S_1$, $S_2$. The cut plane of FIGS. 5 and 6 passing through longitudinal axis L cuts magnetocaloric elements 2 of support $S_1$ mounted in first air gaps $E_1$, but not magnetocaloric elements 2 of support $S_2$ mounted in second air gap $E_2$. This is due to angular offset $\beta$ between the two supports $S_1$ and $S_2$. Magnetizing structures $SM_1$, $SM_2$, $SM_3$ can be the same as those described in the first embodiment of FIGS. 1 to 3, with the difference that magnetic poles $P_{11}$, $P_{12}$; $P_{21}$; $P_{22}$; $P_{23}$, $P_{24}$; $P_{31}$; $P_{32}$ are all aligned with one another longitudinally, without angular offset, as represented in FIGS. 4A, 4B, 5 and 6. The circulation of the magnetic flux in thermal apparatus 100 of FIGS. 4A, 4B and 5 is identical to that described in connection with thermal apparatus 1 of FIGS. 1 and 2, but without angular offset between the magnetic poles. Likewise, the circulation of the magnetic flux in thermal apparatus 110 of FIG. 6 is identical to that described in connection with thermal apparatus 10 of FIG. 3, but without angular offset between the magnetic poles. So, the magnetic cycles undergone by magnetocaloric elements 2 in air gaps $E_1$ and $E_2$ are offset by a phase-shift angle equal to offset angle $\beta$, which allows achieving a magnetic compensation between the attraction/repulsion forces that appear in air gaps $E_1$ et $E_2$ between magnetocaloric elements 2 and magnetic poles $P_{11}$, $P_{12}$; $P_{21}$, $P_{22}$, $P_{23}$, $P_{24}$; $P_{31}$, $P_{32}$ of magnetizing structures $SM_1$, $SM_2$, $SM_3$. This results in a smoothing of the movement of the magnetic structures with respect to supports $S_1$ and $S_2$. In other words, there is a continuous flow of magnetocaloric material entering the magnetic field and the magnetic attraction effort is then almost constant and causes almost no jerk in the movement of the magnetizing structures.

In the thermal apparatuses 1, 10, 100, 110 described, a magnetic cycle comprises two magnetization phases that correspond, for magnetocaloric elements 2, to a position between two magnetic poles $P_{11}, P_{21}; P_{12}, P_{22}; P_{23}, P_{31}; P_{24}, P_{32}$, and two demagnetization phases that correspond, for magnetocaloric elements 2, to a position outside of said poles. Therefore, during a complete revolution of the magnetic arrangement about longitudinal axis L, each magnetocaloric element 2 experiences two successive magnetocaloric cycles comprising two magnetizations and two demagnetizations.

In the examples of thermal apparatuses 100, 110 represented in FIGS. 4A, 4B, 5 and 6, offset angle β between the two supports $S_1$ and $S_2$ corresponds to half angle θ between two adjacent magnetocaloric elements 2. Moreover, as described above, to improve the continuous rotation of the magnetic arrangement, magnetic poles $P_{11}$, $P_{12}$, $P_{21}$, $P_{22}$, $P_{23}$, $P_{24}$, $P_{31}$, $P_{32}$ have the shape of ring portions extending over angular sectors whose angle is determined so as to form the two magnetization phases and the two demagnetization phases over a complete revolution of the magnetic arrangement. The radial layout of the magnetic poles and the radial layout of magnetocaloric elements 2 imply that the entry of magnetocaloric elements 2 in the magnetic field of said magnetic poles $P_{11}, P_{12}, P_{ei}, P_{22}, P_{23}, P_{24}, P_{31}, P_{32}$ starts with an edge, called entry edge 5, which belongs to one of the two end sides F of magnetocaloric elements 2. In the described embodiments, the entry edge of the end side located on internal circle 3 of crown C is the first to enter the magnetic field.

The invention is not restricted to the configuration as illustrated of magnetic poles $P_{11}, P_{12}, P_{21}, P_{22}; P_{23}, P_{24}, P_{31}, P_{32}$ and of supports $S_1$, $S_2$. So, the magnetic poles, which are represented provided with three permanent magnets, may comprise a different number of permanent magnets, for example only one with different shapes.

Likewise, the shape of the magnetic poles may differ from that illustrated, and be adapted to the shape and volume of air gaps $E_1$, $E_2$ dictated by the shape of supports $S_1$, $S_2$ and of magnetocaloric elements 2 to be subjected to the magnetic field of air gaps $E_1$, $E_2$, as well as to the intensity of this magnetic field.

The means for circulating the heat transfer fluid are not represented. They may be provided in the form of of pistons or membranes mechanically driven by a cam that is itself driven in rotation.

POSSIBILITIES FOR INDUSTRIAL APPLICATION

This description shows clearly that the invention allows reaching the goals defined, that is to say offer a magnetocaloric thermal apparatus with the most constant and stable rotational speed possible, with a low sound level, an improved service life and a structurally simple manufacturing. The invention thus allows avoiding the oversizing of the motor that is necessary in the case of large torque variations associated with the variations of the magnetic efforts and allows increasing the average efficiency of said motor and therefore of said apparatus, given that motor consumption is higher in its high torque range.

Such apparatus can in particular find an application, as well industrial as domestic, when it is integrated in a magnetocaloric thermal appliance intended for operation in the area of cooling, air conditioning, tempering, heating or others, at competitive costs and with reduced space requirements.

The present invention is not restricted to the examples of embodiment described, but extends to any modification and variant which is obvious to a person skilled in the art.

The invention claimed is:

1. A magnetocaloric thermal apparatus (1, 10, 100, 110) with a structure that rotates about a longitudinal axis (L), the thermal apparatus (1, 10, 100, 110) comprising:

a magnetic arrangement defining at least two air gaps (E1, E2) at least partly superimposed and parallel to each other, and configured to create, in each of the air gaps (E1, E2), a magnetic field variable about the longitudinal axis (L), at least two at least partly superimposed supports (S1, S2) each being located in a midplane (P1, P2) of one of the air gaps (E1, E2) and carrying magnetocaloric elements (2) at least partly superimposed between the supports, the magnetocaloric arrangement and the supports (S1, S2) being in relative movement with respect to one another, about the longitudinal axis (L), to subject the magnetocaloric elements (2) of each support (S1, S2) to a magnetic cycle created by the variable magnetic field in the corresponding air gap (E1, E2), wherein the magnetic arrangement and the supports (S1, S2) are positioned angularly with respect to one another about the longitudinal axis (L) so as to generate a phase shift between the magnetic cycle undergone by the magnetocaloric elements (2) of one of the supports (S1) in one of the air gaps (E1) and the magnetic cycle undergone by the magnetocaloric elements of the other support (S2) in the other air gap (E2), so that the magnetocaloric elements (2) enter the magnetic field of the air gaps (E1, E2) progressively and continuously between the supports (S1, S2), and an obtained magnetic attraction effort then being almost constant, the magnetic arrangement comprises first, second and third magnetizing structures (SM1, SM2, SM3) each provided with at least one pair of magnetic poles (P11, P12; P21, P22; P23, P24; P31, P32), and positioned successively along the longitudinal axis (L) of the thermal apparatus (1, 10) so as to define, with their pairs of magnetic poles (P11, P12; P21, P22; P23, P24; P31, P32), the air gaps (E1, E2), and the magnetizing structures (SM1, SM2, SM3) are positioned angularly with respect to each other about the longitudinal axis (L) in order to generate a magnetic cycle, in one of the air gaps (E1), that is shifted by a phase-shift angle with respect to the magnetic cycle in the other air gap (E2), wherein the first and the third magnetizing structures (SM1, SM3) are identical and mounted with an angular offset of angle (α) therebetween that corresponds to the phase-shift angle, and the second magnetizing structure (SM2) comprises, on the one hand, first magnetic poles (P21, P22) that form a first air gap (E1) with the corresponding magnetic poles (P11, P12) of the first magnetizing structure (SM1) and, on the other hand, second magnetic poles (P23, P24) that form a second air gap (E2) with the corresponding magnetic poles (P31, P32) of the third magnetizing structure (SM3), and the first magnetic poles (P21, P22)

and the second magnetic poles (P23, P24) of the second magnetizing structure (SM2) are mounted with an angular offset of angle (α) therebetween that corresponds to the phase-shift angle.

2. The thermal apparatus (1) according to claim 1, wherein the first and the third magnetizing structures (SM1, SM3) are mounted head to tail and angularly offset by an angle (α) that corresponds to the phase-shift angle, the first magnetic poles (P21, P22) of the second magnetizing structure (SM2) have a same magnetization direction as the magnetic poles (P11, P12) of the first magnetizing structure (SM1) they cooperate with to form the air gap (E1), the second magnetic poles (P23, P24) of the second magnetizing structure (SM2) have a same magnetization direction as the magnetic poles (P31, P32) of the third magnetizing structure (SM3) they cooperate with to form the air gap (E2), and the magnetization direction of the first and the second magnetic poles (P21, P22, P31, P32) is the same to create one single circulation loop (B) of the magnetic flux inside of the apparatus (1) passing through the first, the second and the third magnetizing structures (SM1, SM2, SM3).

3. The thermal apparatus (10) according to claim 1, wherein the first and the third magnetizing structures (SM1, SM3) are mounted opposite to each other and angularly offset by an angle (α) that corresponds to the phase-shift angle, the first magnetic poles (P21, P22) of the second magnetizing structure (SM2) have a same magnetization direction as the magnetic poles (P11, P12) of the first magnetizing structure (SM1) they cooperate with to form the air gap (E1) and create a first circulation loop (B1) of the magnetic flux inside of the apparatus (10) passing through the first magnetic poles (P21, P22) of the second magnetizing structure (SM2) and the magnetic poles (P11, P12) of the first magnetizing structure (SM1), the second magnetic poles (P23, P24) of the second magnetizing structure (SM2) have the same magnetization direction as the magnetic poles (P31, P32) of the third magnetizing structure (SM3) they cooperate with to form the air gap (E2) and create a second circulation loop (B2) of the magnetic flux inside of the apparatus (10) passing through the second magnetic poles (P23, P24) of the second magnetizing structure (SM2) and the magnetic poles (P31, P32) of the third magnetizing structure (SM3), and the magnetization direction of the second magnetic poles (P23, P24) is opposite to that of the first magnetic poles (P21, P22) to have the magnetic flux circulate in the first loop (B1) in the direction opposite to the magnetic flux that circulates in the second loop (B2).

4. The thermal apparatus (1, 10) according to claim 1, wherein the magnetocaloric elements (2) are positioned angularly on their supports (S1, S2) with respect to each other according to an angle (θ) and the phase-shift angle is smaller than the angle (θ) between two adjacent magnetocaloric elements (2).

5. The thermal apparatus (1, 10) according to claim 1, wherein the supports (S1, S2) are geometrically identical and arranged parallel to each other in the corresponding air gaps (E1, E2) without angular offset.

6. A magnetocaloric thermal apparatus (1, 10, 100, 110) with a structure that rotates about a longitudinal axis (L), the thermal apparatus (1, 10, 100, 110) comprising:

a magnetic arrangement defining at least two air gaps (E1, E2) at least partly superimposed and parallel to each other, and configured to create, in each of the air gaps (E1, E2), a magnetic field variable about the longitudinal axis (L), at least two at least partly superimposed supports (S1, S2) each being located in a midplane (P1, P2) of one of the air gaps (E1, E2) and carrying magnetocaloric elements (2) at least partly superimposed between the supports, the magnetic arrangement and the supports (S1, S2) being in relative movement with respect to one another, about the longitudinal axis (L), to subject the magnetocaloric elements (2) of each support (S1, S2) to a magnetic cycle created by the variable magnetic field in the corresponding air gap (E1, E2), the magnetic arrangement and the supports (S1, S2) are positioned angularly with respect to one another about the longitudinal axis (L) so as to generate a phase shift between the magnetic cycle undergone by the magnetocaloric elements (2) of one of the supports (S1) in one of the air gaps (E1) and the magnetic cycle undergone by the magnetocaloric elements of the other support (S2) in the other air gap (E2), so that the magnetocaloric elements (2) enter the magnetic field of the air gaps (E1, E2) progressively and continuously between the supports (S1, S2), and an obtained magnetic attraction effort then being almost constant, the magnetic arrangement comprises first, second and third magnetizing structures (SM1, SM2, SM3) each provided with at least one pair of magnetic poles (P11, P12; P21, P22; P23, P24; P31, P32), and positioned successively along the longitudinal axis (L) of the thermal apparatus (1, 10) so as to define, with their pairs of magnetic poles (P11, P12; P21, P22; P23, P24; P31, P32), the air gaps (E1, E2), and the magnetizing structures (SM1, SM2, SM3) are positioned angularly with respect to each other about the longitudinal axis (L) in order to generate a magnetic cycle, in one of the air gaps (E1), that is shifted by a phase-shift angle with respect to the magnetic cycle in the other air gap (E2), and the supports (S1, S2) are geometrically identical, arranged parallel to each other in the corresponding air gaps (E1, E2) and offset angularly with respect to each other by an angle (β) that corresponds to the phase-shift angle.

7. The thermal apparatus (100, 110) according to claim 6, wherein the magnetocaloric elements (2) are positioned angularly on their supports (S1, S2) with respect to each other according to an angle (θ) and the angular offset (β) between the two supports (S1, S2) is smaller than the angle (θ) between two adjacent magnetocaloric elements (2).

8. The thermal apparatus (100, 110) according to claim 6, wherein the magnetic arrangement comprises first, second and third magnetizing structures (SM1, SM2, SM3) positioned successively along the longitudinal axis (L) and defining, with their aligned magnetic poles (P11, P12; P21, P22; P23, P24; P31, P32) mounted according to two opposite magnetization directions, a first (E1) air gap and a second (E2) air gap.

9. A magnetocaloric thermal apparatus (1, 10, 100, 110) with a structure that rotates about a longitudinal axis (L), the thermal apparatus (1, 10, 100, 110) comprising:

a magnetic arrangement defining at least two air gaps (E1, E2) at least partly superimposed and parallel to each other, and configured to create, in each of the air gaps (E1, E2), a magnetic field variable about the longitudinal axis (L), at least two at least partly superimposed supports (S1, S2) each being located in a midplane (P1, P2) of one of the air gaps (E1, E2) and carrying magnetocaloric elements (2) at least partly superimposed between the supports, the magnetic arrangement and the supports (S1, S2) being in relative movement with respect to one another, about the longitudinal axis (L), to subject the magnetocaloric elements (2) of each support (S1, S2) to a magnetic cycle created by the variable magnetic field in the corresponding air gap (E1, E2), wherein the magnetic arrangement and the supports (S1, S2) are positioned angularly with respect to one another about the longitudinal axis (L) so as to generate a phase shift between the magnetic cycle undergone by the magnetocaloric elements (2) of one of the supports (S1) in one of the air gaps (E1) and the magnetic cycle undergone by the magnetocaloric elements of the other support (S2) in the other air gap (E2), so that the magnetocaloric elements (2) enter the magnetic field of the air gaps (E1, E2) progressively and continuously between the supports (S1, S2), and an obtained magnetic attraction effort then being almost constant, and the magnetocaloric elements (2) comprise N rectangle parallelepipeds provided with magnetocaloric material and arranged in a crown-shaped area (C) of the support (S1, S2), and the crown (C) is centered along the longitudinal axis (L).

10. The thermal apparatus (1, 10 100, 110) according to claim 9, wherein the crown (C) is defined by two concentric circles called an internal circle and an external circle (3, 4), two of the opposite sides of the rectangle parallelepipeds that form the magnetocaloric elements (2) called end sides (F) are tangent each to one of the concentric circles, and the longitudinal median axes of two adjacent magnetocaloric elements (2) form between them the angle ($\theta$) equal to 360/N degrees.

11. The thermal apparatus according to claim 10, wherein the magnetic poles (P11, P12, P21, P22, P23, P24, P31, P32) have the shape of ring portions that extend over angular sectors whose angle is determined so that entry of the magnetocaloric elements (2) in the magnetic field of the magnetic poles starts with an edge that belongs to one of the end sides (F).

12. The thermal apparatus (1, 10 100, 110) according to claim 1, wherein the magnetocaloric elements (2) are positioned radially on the support (S1, S2).

13. The thermal apparatus (1, 10 100, 110) according to claim 1, wherein the magnetic poles (P11, P12; P21, P22; P23, P24; P31, P32) of each magnetizing structure (SM1, SM2, SM3) are identical, but mounted according to two opposite magnetization directions.

* * * * *